United States Patent [19]

Peng

[11] Patent Number: 5,365,049
[45] Date of Patent: Nov. 15, 1994

[54] FOCUSING MEANS FOR A SYMBOL CODE READER

[75] Inventor: Ke-Ou Peng, Delft, Netherlands

[73] Assignee: Opticon Sensors Europe B.V., Hoofddorp, Netherlands

[21] Appl. No.: 107,505

[22] Filed: Aug. 17, 1993

[30] Foreign Application Priority Data

Aug. 19, 1992 [EP] European Pat. Off. ........ 92202544.0

[51] Int. Cl.$^5$ ............................................. G06K 7/00
[52] U.S. Cl. .................................... 235/462; 359/216
[58] Field of Search ...................... 235/462, 472, 467; 359/216, 217, 218, 219, 205, 405

[56] References Cited

U.S. PATENT DOCUMENTS 4,560,862 12/1985 Eastman et al. .................... 235/467

FOREIGN PATENT DOCUMENTS

| 0206454 | 12/1986 | European Pat. Off. ...... G06K 7/10 |
| 0207163 | 1/1987 | European Pat. Off. .... G06K 7/015 |
| 0276589 | 8/1988 | European Pat. Off. ...... G06K 7/10 |
| 0396485 | 11/1990 | European Pat. Off. ...... G06K 7/10 |
| 2480462 | 10/1981 | France . |
| 0151607 | 7/1986 | Japan ......................... G02B 26/10 |
| 0298214 | 12/1988 | Japan ......................... G02B 26/10 |

Primary Examiner—Davis L. Willis
Assistant Examiner—Karl D. Frech
Attorney, Agent, or Firm—Parmelee, Bollinger & Bramblett

[57] ABSTRACT

Focusing system for a bar code reader, comprising a lens system, wherein for varying the focal length the focusing system is provided with a reflector rotatable around a rotational axis, the reflector comprising at least one reflective surface normally intersecting the optical axis of the lens system, the point of intersection having a distance relative to the lens system which varies in response to the rotation of the reflector.

17 Claims, 4 Drawing Sheets

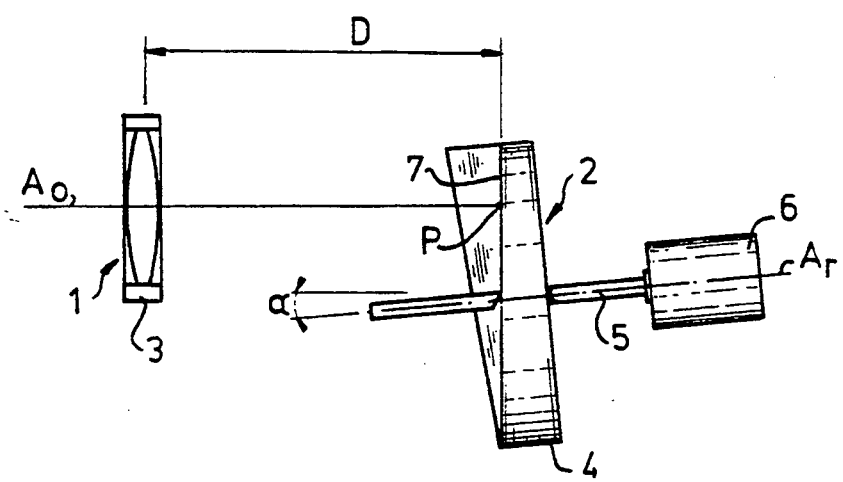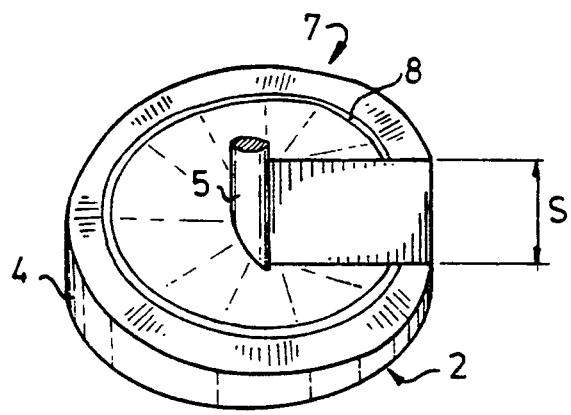

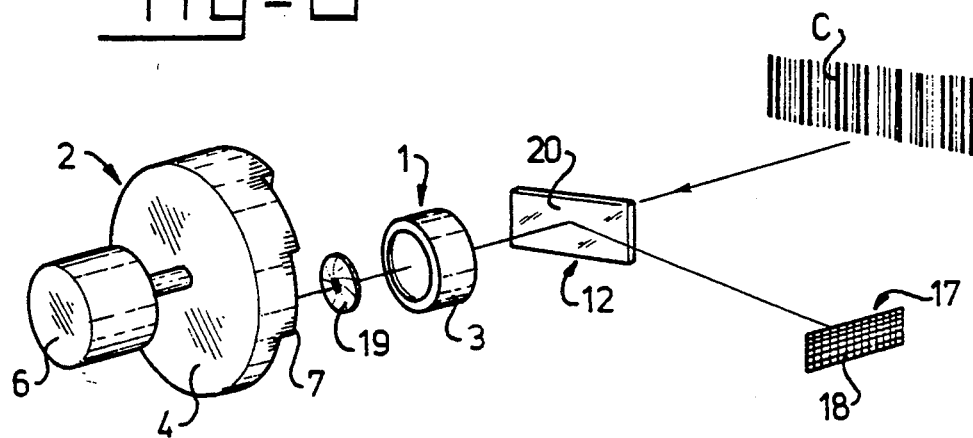
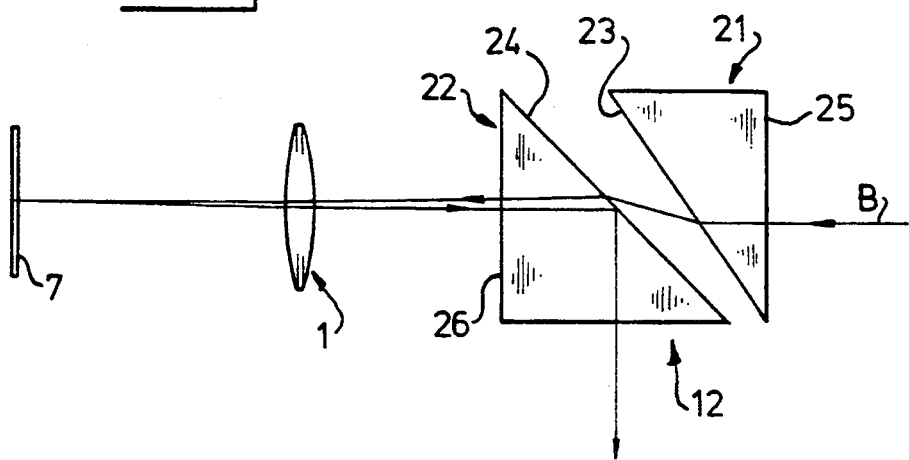

FOCUSING MEANS FOR A SYMBOL CODE READER

BACKGROUND OF THE INVENTION

The present invention relates to a focusing means for a symbol code reader, such as a bar code reader, comprising a lens system, as well as to a bar code reader comprising such a focusing means. Such a focusing means, as well as such a symbol code reader, are known in practice.

Both active and passive readers can be used for reading bar codes or similar symbol codes. In an active reader a thin beam generated by a laser is used to scan the code and the light scattered from it is detected to obtain the information contained in the code. To form such a thin beam focusing optics are often used. In a passive reader the code is imaged onto a sensor array, such as a CCD-array, the array producing signals representative of the bar code. In such a passive reader, ambient light with or without additional illumination is used.

In an active reader the size of the beam in the point of incidence on the bar code should be small, such that the smallest bar width can be detected. In the passive reader the resolution of the imaging optics should be sufficient to detect the smallest bar width by means of the sensor array. In addition, the light scattered from the bar code should be collected effectively so as to enable the sensor array to produce reliable image signals. For these reasons, the aperture of the optical system used in the reader should be large. Such a large aperture, however, leads to a small depth of field. For practical reasons the range of distances at which a bar code can successfully be read, should be as large as possible. Obviously this requires a large depth of field.

In order to obtain a high light collection efficiency and a high spatial resolution as well as a large depth of field, the bar code reader should have a variable focusing distance. In practice the relative positions of the light source (laser) and the focusing optics in active scanners, as well as of the imaging optics and the sensor array in passive scanners, are preferably fixed while varying the focusing distance. This can be achieved if the bar code reader is provided with focusing means having a variable focal length.

EP-A-0,276,589 discloses a bar code symbol reader for changing the working distance of a scanning beam. FIGS. 1–5 disclose embodiments of bar code readers by which the effect of changing working distance of the scanning beam is obtained by a complex system of mirrors and lenses. In an arrangement shown in FIGS. 6A and 6B a changing working distance is obtained by using a light-transmissive rotary plate having different plate portions with different optical distance characteristics. By using a focusing lens with a high magnification factor downstream of the plate a small difference in the thicknesses of the plate portions can cause a large and major shift in the position of the focused beam spot. The arrangement shown in FIGS. 6A and 6B has as many beam spot positions as there are portions on the rotary plate. In FIGS. 7 and 8 a component is shown that, when used instead of the rotary plate in the arrangement of FIGS. 6A, 6B, provides a continuous shifting focused beam spot. The focal length is not changed. Furthermore, only refractive components are used.

SUMMARY OF THE INVENTION

It is an object of the present invention to provide a focusing means for a symbol code reader, such as a bar code reader, having a continuously or discontinuously variable focal length. It is a further object of the present invention to provide a focusing means which can be used in both active and passive symbol code readers. It is still a further object of the present invention to provide a focusing means which is suitable for both autonomous operation, thus providing a range of focal lengths automatically, and controlled operation, thus being able to exactly select one particular focal length. It is yet a further object of the present invention to provide a beam splitter having an improved light efficiency for use in conjunction with a focusing means having a variable focal length.

Accordingly, for varying the focal length the focusing means of the present invention is provided with reflection means rotatable around a rotational axis, the reflection means comprising at least one reflective surface normally intersecting the optical axis of the lens system, the point of intersection having a distance relative to the lens system which varies in response to the rotation of the reflection means.

The present invention is based on the principle of varying the focal length of focusing means having two lenses or lens systems by changing the distance between these two lens systems. If the two lens systems have focal lengths $f_1$ and $f_2$ respectively and if their mutual distance is d, the focal length of the total system is given by $$\frac{1}{f_{system}} = \frac{1}{f_1} + \frac{1}{f_2} - \frac{d}{f_1 \cdot f_2} \quad (1)$$

If $f_1 = f_2 = f$ the above equation can be written as $$f_{system} = \frac{f^2}{2 \cdot f - d} \quad (2)$$

In the focusing means according to the present invention one of the lenses is replaced by a reflection means having a reflective surface, such as a mirror, perpendicular to the optical axis of the first lens or lens system. In this way the number of lenses is obviously halved, thus reducing the costs of the focusing means. The resulting configuration forms symmetrical optics having the well-known advantages of relatively small aberrations.

By changing the distance of the reflective surface relative to the lens system, the focal length of the focusing means is varied. As the light passing through the lens to the reflection means and back through the lens travels the same distance twice, a change in the distance between the lens system and the reflective surface is effectively multiplied by two. Consequently, both the overall size of the focusing means and the required range of travel of the reflective surface relative to the lens system are halved.

In order to effect a variation in the distance between the reflective surface and the lens system, the reflection means is rotatable around a rotational axis. According to a first embodiment of the present invention, the reflection means comprises a plurality of reflective surfaces normal to the rotational axis and spaced in the direction of the optical axis, the optical axis being parallel with the rotational axis. In this embodiment, the individual reflective surfaces are arranged around the rotational axis, each reflective surface having a different distance from the lens system. As the reflection means are rotated, the point of intersection of the optical axis and the reflection means changes from one reflective surface to another, thus varying the distance travelled by the light. As the reflective surfaces are spaced in the direction of the optical axis, they provide different distances, thus creating a number of focusing lengths. The total number of focusing lengths of course depends on the number of reflective surfaces having different distances to the lens system. As the reflective surfaces are normal to the rotational axis, this rotational axis should be arranged parallel with the optical axis. It is, however, possible to use reflective surfaces which are not normal to their rotational axis, in which case their rotational axis should be tilted relative to the optical axis to ensure a substantially normal intersection of the optical axis and the reflective surfaces.

Preferably, adjacent reflective surfaces have gradually increasing or decreasing distances to the lens system. In this way a gradual stepped increase or decrease of the distance to the lens system is achieved, resulting in gradual change of focusing length.

In order to ensure an uninterrupted range of focal lengths of the inventive focusing means, the distances of the reflective surfaces to the lens system are preferably chosen such that the depths of field corresponding with the individual reflective surfaces touch or overlap.

According to a second embodiment of the present invention, the at least one reflective surface has a spiral form, the rotational axis being tilted relative to the optical axis. Due to the spiral form of the reflective surface on the rotatable reflection means, the point of intersection of the optical axis and this reflective surface will have a varying distance relative to the lens system. With such a reflective surface having a spiral form, the centre of the spiral being the rotational axis, a continuous change of distance is possible. In order to achieve a substantially normal incidence of the light on the reflective surface, and thus a proper functioning of the focusing means, the rotational axis of the reflection means are in this embodiment tilted relative to the optical axis.

The reflective surfaces may have several shapes. If the reflection means are constituted by a mirror wheel, the reflective surfaces may have the shape of a sector of a circle. In some instances, however, the reflective surfaces need not cover all of the sector of the circle. If a relatively narrow laser beam has to be reflected or if a relatively small image of a symbol code has to be imaged onto a properly aligned sensor array, the size and area of the reflective surfaces may advantageously be reduced, thus reducing the production costs of the focusing means. In such cases, the reflective surfaces are preferably constituted in such a way that the reflective surfaces comprise one or more reflective strips forming an annular reflector centered at the rotational axis.

The focusing means according to the present invention can advantageously be used in both active and passive bar code readers. Such an active bar code reader comprises, in addition to the focusing means according to the invention, a laser source, a beam focusing lens, a beam splitter, and a sweep generator. The beam splitter serves to separate the laser beam incident on the focusing means and the laser beam emerging from the focusing means. A sweep generator is used to provide a scanning of the bar code. Such a sweep generator may comprise a rotatable polygon having reflective sides, rotated in use by e.g. an electric motor. Other types of sweep generators, such as vibrating mirrors, may also be used.

A passive bar code reader comprises, in addition to the focusing means according to the invention, a beam splitter and image sensing means. In this case the beam splitter serves to separate the light incident on the focusing means from the light emerging from the focusing means, the emerging light being deflected towards the image sensing means. Such an image sensing means preferably comprises a CCD-array. In order to adjust the depth of field and to control aberrations arising from the asymmetry of the bar code and its image, a diaphragm may be used. Preferably, this diaphragm is inserted between the lens system and the reflection means.

The beam splitter used in both the active and passive bar code reader may be constituted by a half mirror. In order to increase the light efficiency the beam splitter is advantageously constituted by at least one prism. Preferably, the beam splitter comprises a first triangular prism and a second triangular prism with facing hypotenuses, the hypotenuse of the second prism being positioned in such a way that the angle of incidence of a beam passing approximately normally through its base is larger than the critical angle. The first prism is used to deflect the beam, normally incident on its base, to the hypotenuse of the second prism such that this beam will impinge on this hypotenuse at small angle. The second prism is used to separate the beams in such a way that the incident beam is refracted into the second prism in the direction close to the critical angle and is substantially normal to its base. The beam, incident on the first prism, is then basically parallel to that emerging from the second prism. The beam, reflected by another optical means back to the second prism and passing through the base, will have a direction in which total reflection will appear at the hypotenuse. The light efficiency can be further improved if at least one of the prisms is coated.

From EP-A-0,206,454 a mirror wheel having several reflecting surface parts is known. This known mirror wheel, however, is only used as a beam splitter in a time division manner. No change of working distance of the beam spot by using the mirror wheel in the optical path is obtained or suggested. In this known arrangement only a single reading surface is used, so that although the optical path length of the light beam is changed at the position of the mirror wheel at the end all generated beam spots must be exactly located in the single reading surface.

BRIEF DESCRIPTION OF THE DRAWINGS

The invention will be further explained in reference to the accompanying drawings.

FIG. 3 shows a plan view in partial cross-section of a second embodiment of the focusing means of the invention.

FIG. 4 shows in perspective the reflection means of the embodiment of FIG. 3.

FIG. 6 shows in perspective a passive bar code reader comprising focusing means according to the present invention.

FIG. 7 shows a plan view of a beam splitter for use in conjunction with focusing means according to the present invention.

DETAILED DESCRIPTION OF THE EMBODIMENTS

Figure 1:
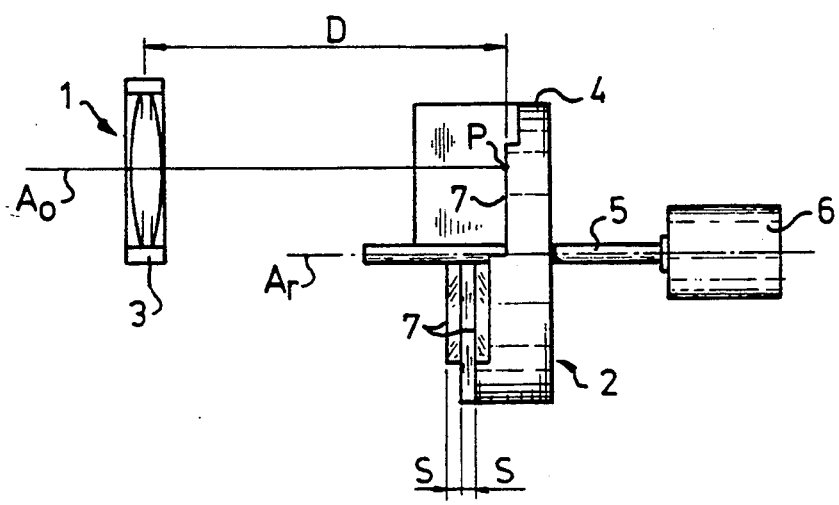
FIG. 1 shows a plan view in partial cross-section of a first embodiment of the focusing means according to the invention.
Figure 2:
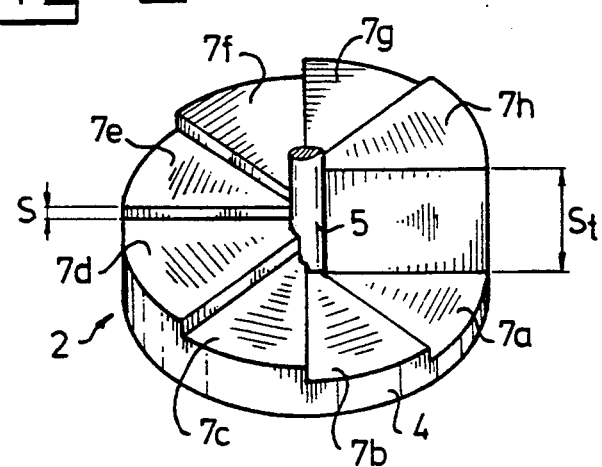
FIG. 2 shows in perspective the reflection means of the embodiment of FIG. 1.

The focusing means schematically shown in FIG. 1 comprises a lens system 1 and a reflection means 2. The lens system 1 comprises a single lens or a set of lenses arranged in a holder 3. The reflection means 2 comprises a wheel 4 connected to a shaft 5. In use the shaft 5 and the wheel 4 are rotated by an electric motor 6. The wheel 4 has on its side facing the lens system 1 a number of reflective surfaces 7, as is also shown in FIG. 2. For the sake of clarity of the illustration, supports, bearings, a housing and other elements which are not essential for a proper understanding of the invention have been omitted from the figures.

In FIG. 2 the wheel 4 is shown to have eight reflective surfaces $7a$, $7b$, $7c$ .... $7h$, each of which has a different position in the longitudinal direction of the shaft 5. That is, each of the surfaces 7 is perpendicular to the shaft 5 and is separated from the next surface by a step S. In FIG. 2, all of the steps S are of equal size, thus leading to a gradual stepped increase of the height of the surfaces in the clockwise direction. The step $S_t$ equals the sum of all the previous steps. As is shown in FIG. 1, light passing through the lens system 1 along the optical axis $A_o$ travels a distance D, then impinges on a reflective surface 7, say surface $7b$, at a point P of incidence, and is reflected back towards the lens system 1, again travelling the distance D. The particular distance D travelled depends on the particular surface 7 intersecting the optical axis $A_o$. For example, if reflective surface $7b$ (also see FIG. 2) intersects the optical axis $A_o$ at the point P, the distance D travelled by the light will be greater by an amount S than in the case that reflective surface $7c$ intersects the optical axis $A_o$ at a point P' (not shown), but will be smaller by an amount S than in the case in which the reflective surface $7a$ reflects the light. In the embodiment shown in the FIGS. 1 and 2, the distance D can therefore in total be varied over a range equal to $S_t$. Referring to the above-mentioned formula (2), it should be noted that $D = \frac{1}{2}d$, so that a change by the amount of $S_t$ in the distance D corresponds with a change by the amount of $2 \times S_t$ in the distance d between two lenses. That is, the change in optical power relative to the change in position is doubled by the reflective action of the surfaces 7.

The motor 6 can rotate the reflection means 2 continuously or discontinuously. During a continuous rotation the focal length is changed as the next reflective surface 7 is moved in position, that is in an intersecting relationship with the optical axis $A_o$. In this way the reading of a bar code can be done on a trial-and-error basis, uninterruptedly changing the focal length and trying to detect the code. A discontinuous or controlled movement allows the focusing means to be adapted to a certain situation, for example when a range finder is used to determine the distance of the bar code from the focusing means. In order to provide a stepped rotation, the focusing means may be provided with suitable motor control means (not shown).

As mentioned above, the reflection means 2 of FIG. 2 has eight surfaces $7a$ .... $7h$ spaced apart at equal steps S, $S_t$ being the sum of all the preceding steps. It is of course possible to have a different number of reflective surfaces 7, for example two, three, four or five surfaces 7. Also, the surfaces 7 could be arranged in a different order, and the steps S could have different sizes. In the embodiment shown in FIGS. 1 and 2, the reflective surfaces 7 are normal to the shaft 5, while the shaft 5 and therefore the rotational axis $A_r$ are parallel with the optical axis $A_o$, resulting in normal incidence at the point P. If the surfaces 7 are not perpendicular to the shaft 5, the rotational axis $A_r$ can be tilted relative to the optical axis $A_o$ in order to compensate for this. Although a focusing means could be designed in which the optical axis $A_o$ is not normal to the surfaces 7, or in which the light is not normally incident on the surfaces 7, the advantage offered by normal incidence is the very small range of the reflected beam. That is, light which would be reflected at different distances D under an angle i.e. non-normally, would be deflected towards different points in space and would therefore either miss the lens system 1 or put constraints on the design of the focusing means by requiring extra mirrors or a larger lens system.

FIG. 3 shows schematically another embodiment of the focusing means according to the present invention, in which the reflection means has a different design. The focusing means of FIG. 3 also comprises a lens or lens system 1 arranged in a holder 3, a reflection means 2, a shaft 5 and a motor 6. The reflection means 2 of FIG. 3, which is shown in perspective in FIG. 4, comprises a wheel 4 having a single reflective surface 7. This surface 7 is spirally arranged around the shaft 5. A single step S provides the separation between the beginning and the end of the spiral and marks the greatest variation in the distance D in FIG. 3. As the spiral surface 7 can only be perpendicular to the shaft 5 in one direction, the rotational axis $A_r$ of the reflection means 2 is tilted over an angle a relative to the optical axis $A_o$. In this way, normal incidence in the point P of incidence is maintained. As the reflection means 2 is rotated by the motor 6, the distance D is continuously varied, resulting in smooth and uninterrupted variation of the focal length of the focusing means. A continuous rotation of the motor 6 provides an ongoing variation of the focal length, which can be used in trial-and-error applications. The rotation of the motor 6 can also be controlled by suitable motor control means (not shown) in such a way, that a certain predetermined focal length is achieved.

In the embodiments of FIGS. 3 and 4, the reflection means comprise a single reflective surface 7, rising in the clockwise direction. It will be understood that other continuous configurations are also possible, e.g. by having a reflective surface 7 which rises and falls, thus eliminating the step S, or by having two or more steps S separating partial spiral surfaces. If the reflective surface 7 undulates i.e. rises and falls as it goes around its axis, it is possible to design the reflection means 2 such that it is symmetrical resulting in an improved rotation stability. This applies of course as well to the embodiment of FIGS. 1 and 2.

In the FIGS. 2 and 4, the reflective surfaces 7 are shown to substantially occupy all of the top surface of the wheel 4. In some applications, however, the surface area of the reflective surface 7 can be greatly reduced. For instance, if a relatively thin laser beam has to be focused, the reflective surface 7 can be reduced to a relatively narrow strip 8, as is shown in FIG. 4. As is generally known, a bar code consists of a series of bars and spaces of various width. It can be read in a single direction, that normal to the bars. The image quality in the direction along the bar is less important. The strip aperture due to the strip 8 is not situated in such a way that it is parallel to the bar. The small aperture in the direction normal to this bar will decrease the geometrical aberrations and extend the depth of field. In another direction the aperture collects more light for the sensor, even though the image quality may be decreased. Furthermore, if the reflective surface 7 is e.g. manufactured by polishing a metal surface, the production costs can be reduced by reducing the reflective surface area.

It will be understood that the circular reflective strip 8 which is centered around the shaft 5 can be equally well applied to the stepped reflection means of FIG. 2 as to the continuous reflection means of FIG. 4. In conjunction with a suitable lens system and/or a suitable beam splitter the reflection means 2 may be provided with multiple reflective surfaces 7 or 8 spaced apart in the radial direction, thus providing an even greater variation in focal lengths.

Figure 5:
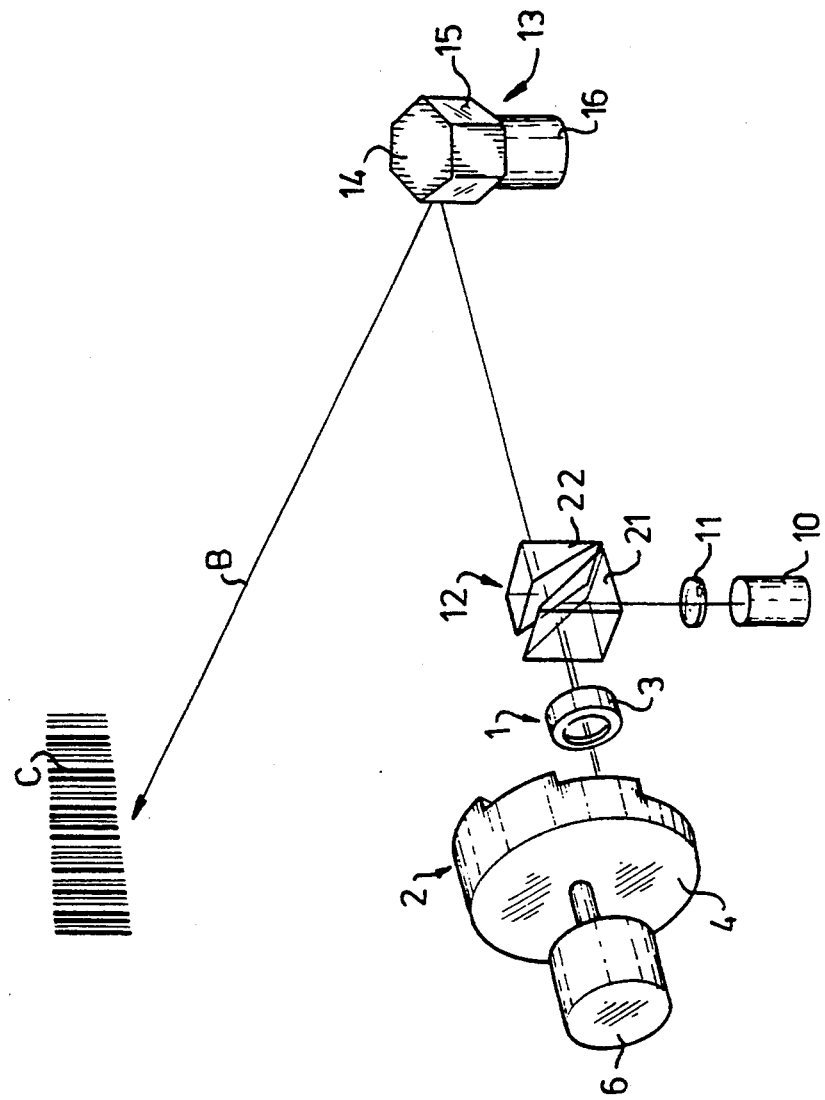
FIG. 5 shows in perspective an active bar code reader comprising focusing means according to the present invention.

The bar code scanner shown in FIG. 5 comprises focusing means according to the invention as shown in FIG. 1. The focusing means comprises a lens system 1 and reflection means 2, the reflection means comprising a wheel 4 which in use is rotated continuously or discontinuously by a motor 6 through a shaft 5. A laser beam is generated by a laser 10, such as a diode laser, and focused by a lens 11. A beam splitter 12, which in the embodiment shown consists of a first triangular prism 21 and a second triangular prism 22, directs the laser beam towards the lens system 1. After being reflected by the reflection means 2, the laser beam passes again through the lens system 1 and through the beam splitter 12, and impinges upon the sweep generator 13. The sweep generator 13 consists of a rotating polygon 14 having reflective sides 15. The polygon 14 is in use rotated by a motor 16, which is preferably an electric motor. The sweep generator 13 directs the laser beam B towards the bar code C. The light scattered by the bar code C is then detected by suitable detection means (not shown). The components of this active bar code reader are preferably accommodated in a suitable housing which is not shown for the sake of clarity of the illustration.

FIG. 6 shows a passive bar code reader, comprising a lens system 1 and reflection means 2. Also in this embodiment the reflection means 2 comprises a mirror wheel 4 driven by a motor 6 through a shaft 5. Ambient light or light from a supplementary light source (not shown) is scattered by the bar code C. This scattered light passes through a beam splitter 12, which is in the present embodiment constituted by a half mirror 20. The light subsequently passes through the lens system 1 and a diaphragm 19. The light is then reflected by a reflective surface 7 of the wheel and passes again through the diaphragm 19 and the lens system 1. The beam splitter 12 is arranged in such a way that the light emerging from the lens system 1 is deflected towards an image sensor 17. In the embodiment shown in FIG. 6, the image sensor 17 is constituted by a CCD-array 18 connected to suitable detection means, such as a signal processor or a general purpose computer (not shown).

In the embodiment of FIG. 6, the diaphragm 19 is used to adjust the depth of field and to control aberrations arising from the asymmetry of the bar code and its image. If such adjustments are not necessary, the diaphragm 19 may be omitted. The mirror wheel 4 is shown to have a plurality of reflective surfaces 7. It will be understood that the reflection means of FIG. 4 or similar reflection means can also be applied in the bar code reader of FIG. 6. The reflective surface may cover all of the surface area of the reflection means 2, or may for instance be constituted by a reflective strip 8 such as shown in FIG. 4. Instead of the half mirror 20 another type of beam splitter 12 may be used, such as a beam splitter made up of prisms. The bar code reader of FIG. 6 is preferably accommodated in a suitable housing, which is not shown for the sake of clarity of the illustration.

Reflection means as e.g. shown in FIGS. 1-4 may also be used for shifting the image plane or source plane without changing the focal length if a beam splitter is inserted behind the optics.

The light efficiency of a bar code reader provided with focusing means according to the present invention may be enhanced by using a beam splitter or separator 12 which is constituted by two prisms, as is shown in FIG. 7. The beam splitter 12 of FIG. 7 comprises a first triangular prism 21 and second triangular prism 22 with facing hypotenuses 23 and 24. A light beam B incident on the base 25 of the first prism 21 is deflected at its hypotenuse 23 and impinges on the hypotenuse 24 of the second prism 22 and is deflected by it. The beam B emerges from the base 26 of the second prism 22 substantially normally and may subsequently impinge upon e.g. the lens system 1. The beam emerging from e.g. the lens system 1 passes through the second prism 22 and is reflected sideways at its hypotenuse 24 if the angle of incidence upon the hypotenuse 24 is larger than the critical angle. The lateral shift of the beam emerging from the base 26 of the second prism 22 is exaggerated in FIG. 7 for the sake of clarity and may in practice be very small. The efficiency of this beam splitter 12 can be further enhanced by coating all optical surfaces. A single prism (22) can be used to separate two beams, if the incident light passes one prism surface, and if the other beam from the opposite side is totally reflected at the same surface. However, such a prism will give a rise of geometrical distortion and additional aberration, such as astigmatism, to the beam. In order to decrease this distortion and aberration, another prism (i.c. the first prism (21)) is inserted. With this additional prism (21), the incident beam may substantially be parallel to it when leaving the second prism, or close to the optical axis of the imaging optics. It will be understood that the beam splitter shown in FIG. 7 can be applied both in active and passive symbol code readers in order to increase their light efficiency.

The invention provides a focusing means which allows the focal length to be varied continuously or stepwise over a relatively large range, using only a single lens or set of lenses. The moving parts can be driven by e.g. a relatively simple electric motor which may provide a continuous rotation without any further need of control, or a discontinuous, controlled rotation in order to focus at a specific distance. The effective reading range of a bar code reader or other symbol code reader, such as a reader for alphanumerical characters, can therefore be extended in a simple and inexpensive manner.

I claim:

1. A focusing means for a bar code reader, comprising a lens system, wherein for varying the focal length the focusing means is provided with reflection means rotatable around a rotational axis, the reflection means comprising at least one reflective surface normally intersecting the optical axis of the lens system, the point of intersection having a distance relative to the lens system which varies in response to the rotation of the reflection means.

2. A focusing means according to claim 1, wherein the reflection means comprises a plurality of reflective surfaces normal to the rotational axis and spaced in the direction of the optical axis, the optical axis being parallel with the rotational axis.

3. A focusing means according to claim 2, wherein adjacent reflective surfaces have gradually increasing distances to the lens system.

4. A focusing means according to claim 2, wherein adjacent reflective surfaces have gradually decreasing distances to the lens system.

5. A focusing means according to the claim 2, wherein the distances of the reflective surfaces to the lens system are chosen such that the depths of field corresponding with the individual reflective surfaces overlap.

6. A focusing means according to claim 1, wherein the at least one reflective surface has a spiral form, the rotational axis being tilted relative to the optical axis.

7. A focusing means according to claim 1, wherein the reflective surface comprises at least one reflective strip forming an annular reflector centered at the rotational axis.

8. A bar code reader comprising a focusing means according claim 1, further comprising a laser source, a beam focusing lens, a beam splitter, and a sweep generator.

9. A bar code reader according to claim 8, wherein the sweep generator comprises a rotatable polygon having reflective sides, rotated in use by an electric motor.

10. A bar code reader according to claim 8, wherein the sweep generator comprises an oscillating mirror.

11. A bar code reader comprising a focusing means according claim 1, further comprising a beam splitter and image sensing means.

12. A bar code reader according to claim 11, wherein the image sensing means comprises a CCD-array.

13. A bar code reader according to claim 11, further comprising at least one diaphragm positioned between the lens system and the beam splitter.

14. A bar code reader according to claim 8, wherein the beam splitter is constituted by a half mirror.

15. A bar code reader according to claim 8, wherein the beam splitter is constituted by at least one prism.

16. A beam splitter for use in a bar code reader according to claim 15, comprising a first triangular prism and a second triangular prism with facing hypotenuses, the hypotenuse of the second prism being positioned in such a way that the angle of incidence of a beam passing approximately normally through its base is larger than the critical angle.

17. A beam splitter according to claim 16, wherein at least one prism is coated.

* * * * *